(12) United States Patent
Tisdale et al.

(10) Patent No.: US 11,472,255 B2
(45) Date of Patent: Oct. 18, 2022

(54) CHILLER/WARMER COMBINATION FOR AN ELECTRIC VEHICLE

(71) Applicant: Honda Motor Co., Ltd., Tokyo (JP)

(72) Inventors: Tyler A. Tisdale, Columbus, OH (US); Alanna Ho, Dublin, OH (US); Christopher E. Lang, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 17/027,123

(22) Filed: Sep. 21, 2020

(65) Prior Publication Data

US 2022/0088992 A1    Mar. 24, 2022

(51) Int. Cl.
*B60H 1/32*     (2006.01)
*B60H 1/00*     (2006.01)
*B60K 11/02*    (2006.01)

(52) U.S. Cl.
CPC ..... *B60H 1/00385* (2013.01); *B60H 1/00278* (2013.01); *B60H 1/00878* (2013.01); *B60K 11/02* (2013.01); *B60H 2001/00307* (2013.01)

(58) Field of Classification Search
CPC ............ B60H 1/00385; B60H 1/00278; B60H 1/00878; B60H 2001/00307; B60K 11/02
USPC .......................................................... 62/244
See application file for complete search history.

(56) References Cited

U.S. PATENT DOCUMENTS

| 4,327,802 | A | 5/1982 | Beldam | |
|---|---|---|---|---|
| 9,989,317 | B2 | 6/2018 | Katoh | |
| 2006/0113068 | A1 | 6/2006 | Desai et al. | |
| 2010/0001086 | A1* | 1/2010 | Bhatti | B60H 1/025 237/9 R |
| 2017/0054188 | A1* | 2/2017 | Blatchley | H01M 10/663 |

FOREIGN PATENT DOCUMENTS

| CN | 107351634 A | | 11/2017 |
|---|---|---|---|
| CN | 108312866 A | | 7/2018 |
| JP | 2003148881 | * | 5/2003 |
| KR | 20160033839 A | | 3/2016 |

OTHER PUBLICATIONS

Sekulić and Shah, "Thermal Design Theory of Three-Fluid Heat Exchangers," vol. 26, 1995, pp. 219-328, https://www.sciencedirect.com/science/article/pii/S0065271708702971.

* cited by examiner

*Primary Examiner* — Davis D Hwu
(74) *Attorney, Agent, or Firm* — Plumsea Law Group, LLC

(57) ABSTRACT

A chiller/heater combination system for electric vehicles. The system includes a heat exchanger for 3 fluids. A first fluid is a high-temperature heat exchange fluid that cools components that generate heat, a second fluid is air conditioning refrigerant, and a third fluid is low-temperature heat exchange fluid used to heat or cool the motive unit. The heat exchanger may be a stacked plate design for three fluids. The low-temperature heat exchange fluid is cooled or heated in the three-fluid heat exchanger.

19 Claims, 13 Drawing Sheets

CHILLER/WARMER COMBINATION FOR AN ELECTRIC VEHICLE

BACKGROUND

1. Field of the Disclosure

The present disclosure relates to a heat exchanger for a vehicle having an electrified powertrain. In particular, the disclosure relates to a chiller/warmer combination unit for a vehicle having an electrified powertrain.

2. Description of Related Art

Vehicles having an electrified powertrain require heat removal from selected components. For example, the interior of the passenger cabin may be cooled for passenger comfort. Alternatively, the cabin may be heated under certain circumstances. The powertrain battery of a vehicle having an electrified powertrain may require cooling or heating, depending on the circumstances. Other components also may require cooling, heating, or both.

Present configurations of such electric vehicles include separate chiller and heater devices. These devices are expensive, impinge upon space for other components of the vehicle, and add significant weight to the vehicle.

There is a need in the art for a system and method that cools components, heats components, or both heats and cools components simultaneously on demand within one system.

SUMMARY OF THE DISCLOSURE

The disclosure relates to a chiller/heater combination system for vehicles having electrified powertrains. The system includes a heat exchanger for three fluids, which are used to cool an engine or power electronics ("engine coolant"); to provide cabin air conditioning and cooling of fluids, as appropriate; and to heat or cool the motive battery or integrated power unit ("battery coolant"). The heat exchanger may be a stacked plate design for the three fluids.

In one aspect, the disclosure provides a heat exchange system for three heat exchange fluids. The system comprises a high-temperature heat exchange fluid circuit that cools an engine or power electronics, an air conditioning refrigerant, a low-temperature heat exchange fluid circuit used to heat or cool a motive battery or integrated power unit; and a stacked plate heat exchanger for the three fluids. The low-temperature heat exchange fluid may be heated by the high-temperature heat exchange fluid or cooled with the air conditioning refrigerant. Heat exchange occurs in the three-fluid heat exchanger.

In another aspect, the disclosure provides a method for warming a motive battery of a vehicle having an electrified powertrain. In accordance with the method, a high-temperature heat exchange fluid absorbs heat from an engine or power electronics. The warm high-temperature heat exchange fluid then is used to warm a low-temperature heat exchange fluid in a three-fluid stacked plate heat exchanger. Air conditioning refrigerant bypasses the three-fluid heat exchanger and an air conditioning refrigerant heat exchange fluid circuit often is not used when circumstances require warming of the battery. The motive battery then is warmed with the warmed low-temperature heat exchange fluid.

In still another aspect, the disclosure provides a method for cooling a motive battery of a vehicle having an electrified powertrain. In accordance with the method, a low-temperature heat exchange fluid is cooled with air conditioning refrigerant. Flow from a high-temperature heat exchange fluid circuit typically bypasses the three-fluid heat exchanger because heat is not needed in the three-fluid heat exchanger when the motive battery is being cooled in a stacked plate heat exchanger for three fluids. The motive battery is cooled with the cooled low-temperature heat exchange fluid.

Other systems, methods, features, and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
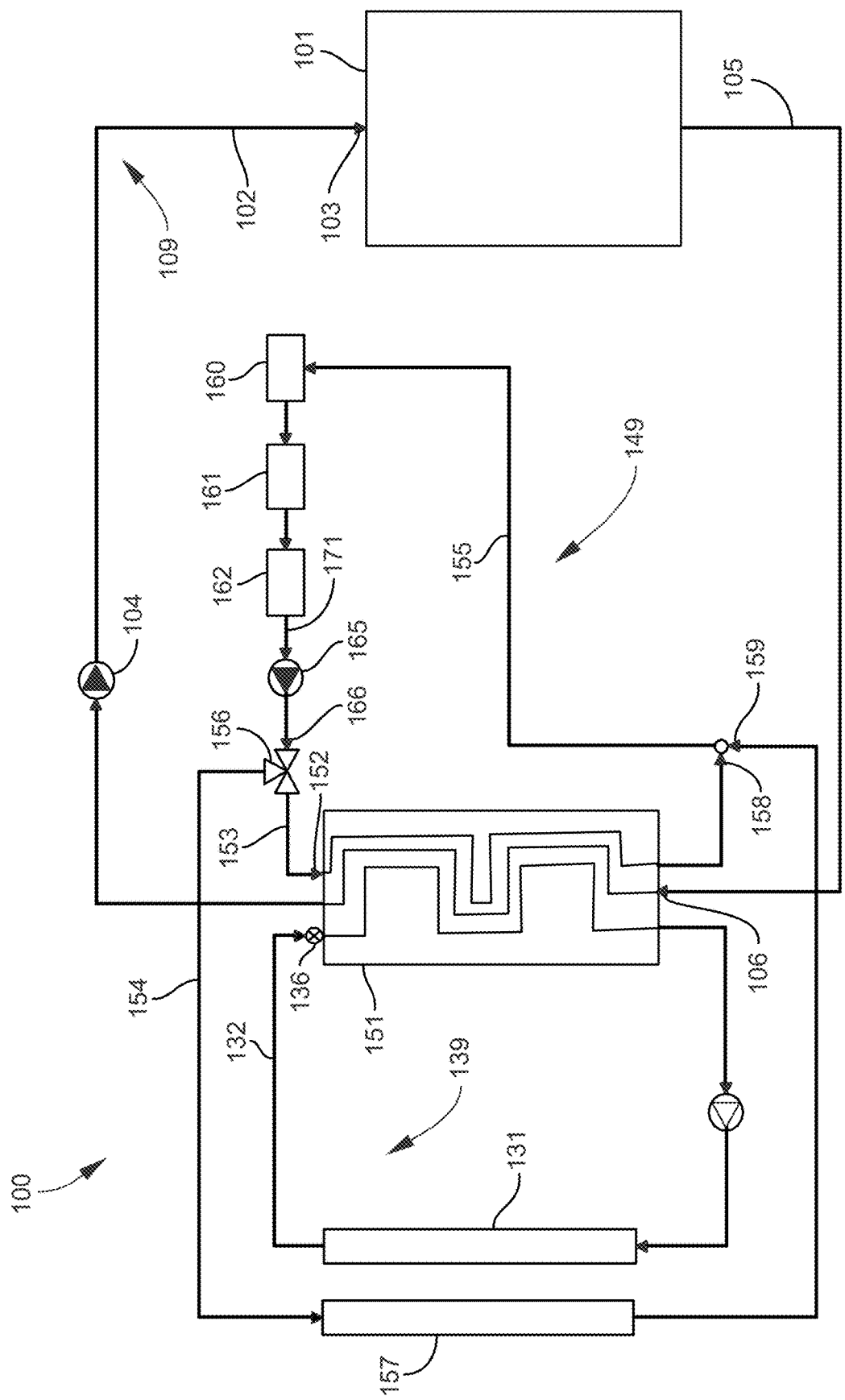
FIG. 1 illustrates an embodiment of a system warming a motive battery.

Electric vehicles utilize systems including batteries, chargers, and other equipment that does not operate efficiently, or at all, if the temperature of the system is not within a specific predetermined range. The exact temperature range at which equipment operates most efficiently relates to the type of equipment. In particular, the motive battery requires control of battery temperature to ensure that the battery is not damaged by use at a temperature outside the operative range. Control of battery temperature also enables efficient operation to maximize range.

For example, a motive battery, i.e., the battery that provides motive power to the electric vehicle, may operate best at a temperature between about 10° C. and about 50° C., whereas another type of motive battery may operate best at a temperature between about 20° C. and about 35° C. Other equipment, such as chargers and other features of the power electronics utilized in electric vehicles, also may require a temperature within a specific range.

Electric vehicles may be of the BEV or PHEV types, amongst others. As skilled practitioners recognize, a BEV type electric vehicle has a driving range limited by the ability to store energy in the motive battery and to use that energy. A primary difference of the PHEV type from the BEV type is that the PHEV type includes a fuel tank and an internal combustion engine, and so has an essentially unlimited range. The disclosure herein applies to both types, as set forth below. In some circumstances, both heating and cooling of various elements is required simultaneously.

Electric vehicles may use an integrated power unit, which may have temperature range requirements not unlike a motive battery. Motive batteries also may be known as traction batteries. These terms are used to distinguish these demanding devices from other, smaller batteries that may be present in an electric vehicle. For convenience of description, these terms may be used interchangeably throughout this specification. The term 'motive unit' also may be used and should be considered to include motive battery, traction battery, and integrated power unit.

Throughout the specification and claims, three fluids are described. High-temperature heat exchange fluid is a heat transfer fluid that does not freeze at low temperatures, such as about −40° C. (about −40° F.), and remains fluid at high temperature in use, such as about 135° C. (about 275° F.), typically in a pressurized system at 15 psi. A heat transfer fluid is a fluid that has a high heat capacity so that a heat exchange system can be made compactly. Glycols and aqueous solutions of glycols typically make good heat transfer fluids at these conditions. For example, one such fluid is a solution of 50 vol pct ethylene glycol in 50 vol pct water. Such fluids typically are used to cool internal combustion engines. Low-temperature heat exchange fluid is a fluid that does not freeze at low temperatures, such as about −40° C. (about −40° F.) and remains fluid at about 100° C. (about 212° F.) to keep a motive battery of an electric vehicle at a temperature between about 20° C. (about 68° F.) and about 50° C. (about 122° F.), and more typically between about 20° C. (about 68° F.) and about 35° C. (about 95° F.).

Air conditioning refrigerant is a heat exchange fluid that exchanges heat from the surroundings, sometimes by phase change. For example, Freon® products may be suitable, so long as they have a formula that does not adversely impact the ozone layer, as R-12 and R-22. Thus, suitable products include R-134a (which soon will be banned for automobile products in the United States) and R-1234yf.

FIG. 1 illustrates an embodiment of the disclosure for warming the motive battery in a BEV system. In system 100, motive battery 101 is warmed by flow of warmed low-temperature heat exchange fluid stream 102 flowing in the direction of flow arrow 103 in low-temperature heat exchange fluid circuit 109. Now-cooled low-temperature heat exchange fluid stream 105 flows in the direction of flow arrow 106 to three-fluid heat exchanger 151. Low-temperature heat exchange fluid stream 102 flows through three-fluid heat exchanger 151, in which it is warmed, and is circulated to and through motive battery 101 by pump 104 in low-temperature heat exchange fluid circuit 109.

In this embodiment, low-temperature heat exchange fluid stream 105 is warmed in three-fluid heat exchanger 151 by first warmed portion stream 153 of high-temperature heat exchange fluid stream 171 in high-temperature heat exchange fluid circuit 149. High-temperature heat exchange fluid stream 171 is divided by three-way valve 156 into first warmed portion 153 and second warmed portion 154. First warmed portion 153 flows in the direction of flow arrow 152 and into three-fluid heat exchanger 151. Second warmed portion 154 of high-temperature heat exchange fluid stream 155 bypasses three-fluid heat exchanger 151 and is cooled in radiator 157 and re-joined at flow arrow 159 with now-cooled first warmed portion stream 153 at flow arrow 158 after flowing out of three-fluid heat exchanger 151.

In such embodiments, the relative flow rates of first warmed portion stream 153 and second warmed portion stream 154 are established by three-way valve 156 so as to provide the heat required by motive battery 101 carried to motive battery 101 in warmed low-temperature heat exchange fluid stream 102. The transfer of the greatest quantity of heat may be achieved by operating three-fluid heat exchanger 151 to maximize heat flow to warm low-temperature heat exchange fluid stream 102, and then to transfer that heat to battery 101. Maximum practical heat recovery from first warmed portion stream 153 of high-temperature heat exchange fluid stream 155 may be useful because the heat remaining in second warmed portion 154 of high-temperature heat exchange fluid stream 155 is dissipated in radiator 157 in high-temperature heat exchange fluid circuit 149.

The amount of heat exchanged in three-fluid heat exchanger 151 and the rate at which it may be exchanged may be as great as the amount of heat required to heat motive battery 101 to a temperature and at a rate appropriate for the battery type. The skilled practitioner recognizes that the various types and designs of motive batteries can be used in an electric vehicle have different compositions, properties, and characteristics. Therefore, these batteries may have different maximum heating rates, operating temperatures, and total heat absorption required to operate the motive battery efficiently and safely. Thus, the skilled practitioner can adjust heat transfer quantities and rates by adjusting relative flow of the fluid streams exchanging heat. Typically, motive batteries of different types may operate best if the motive battery is at a temperature between about 10° C. and about 60° C., typically between about 20° C. and about 50° C., and more typically between about 20° C. and 35° C.

In this embodiment, high-temperature heat exchange fluid cooled in radiator 157 is rejoined at flow arrow 159 with the flow at flow arrow 158 of cooled high-temperature heat exchange fluid from three-fluid heat exchanger 151. These two streams are combined to form high-temperature heat exchange fluid stream 155. In high-temperature heat exchange fluid circuit 149, cool high-temperature heat exchange fluid stream 155 now is used to cool first power electronic device 160, second power electronic device 161, and third power electronic device 162. First power electronic device 160 may be a power control unit, second power electronic device 161 may be an on-board computer, and third power electronic device 162 may be a motor. These and other power electronic devices requiring cooling by the high-temperature heat exchange fluid may be arranged in high-temperature heat exchange fluid circuit 149 in an order that most efficiently uses the cool high-temperature fluid stream 155 to absorb or remove heat. More or fewer power electronic devices may be present. The now-warmed high-temperature heat exchange fluid stream 171 is pumped through pump 165 in the direction of flow arrow 166 to three-way valve 156 in high-temperature heat exchange fluid circuit 149.

In some embodiments of this battery heating mode illustrated in FIG. 1, air conditioning refrigerant 132 will not flow to expansion valve 136, three-fluid heat exchanger 151, and condenser 131 in air conditioning refrigerant heat exchange fluid circuit 139 because cooling typically is not required in three-fluid heat exchanger 151 in this heat harvesting mode.

Figure 2:
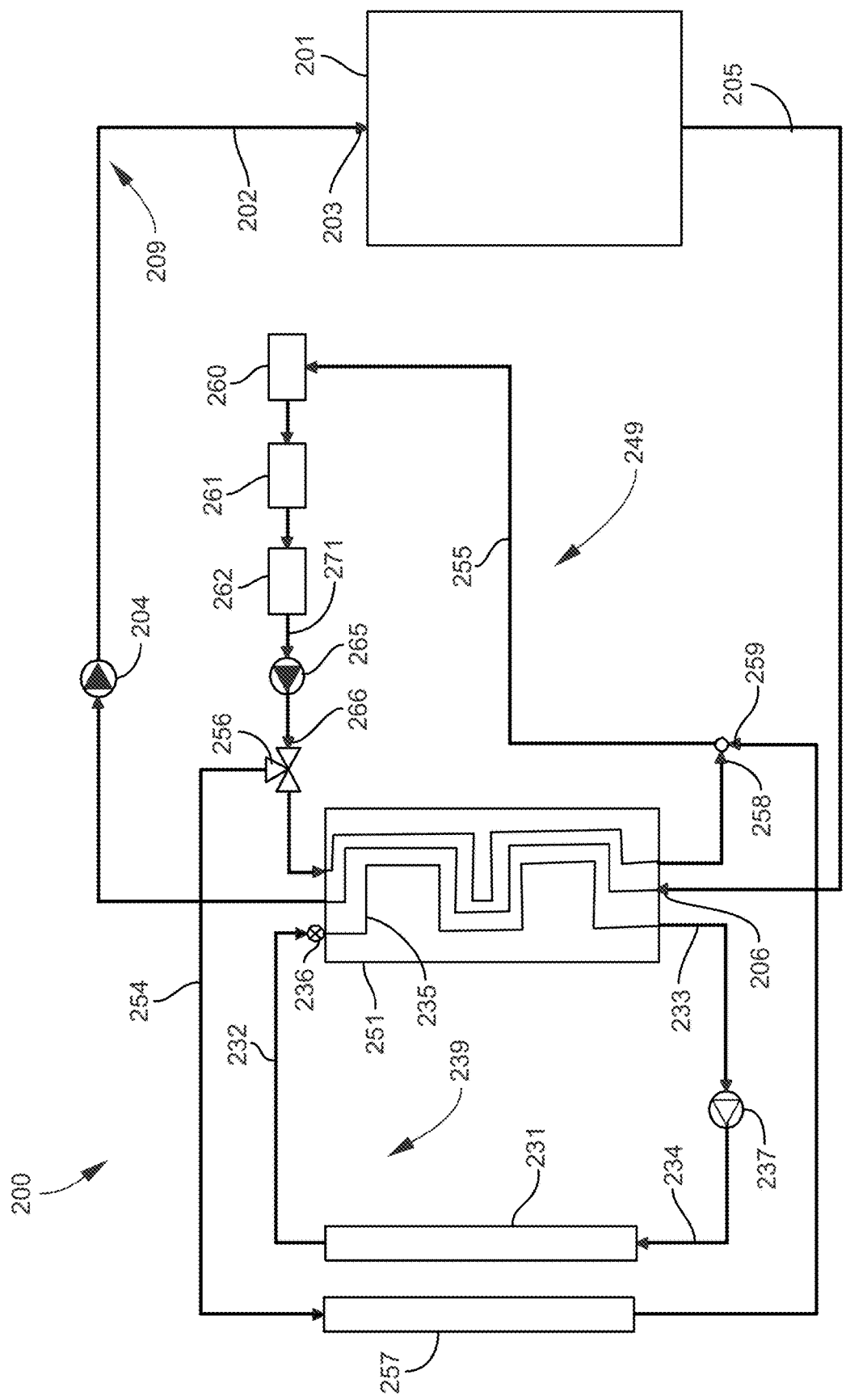
FIG. 2 illustrates an embodiment of a system cooling a motive battery.

In some embodiments, it is necessary to cool the motive battery while cooling power electronic devices. FIG. 2 illustrates such embodiments. In system 200, motive battery 201 is cooled by flow of cooled low-temperature heat exchange fluid stream 202 flowing in low-temperature heat exchange fluid circuit 209 in the direction of flow arrow 203. Cooled low-temperature heat exchange fluid stream 202 flows through and out of three-fluid heat exchanger 251, where low-temperature heat exchange fluid heat exchanger fluid stream 202 is cooled by heat exchange with air conditioning refrigerant stream 235. The low-temperature heat exchange fluid is circulated through motive battery 201 by pump 204. The now-heated low-temperature heat exchange fluid stream 205 flows in the direction of flow arrow 206 to three-fluid heat exchanger 251 to be cooled in low-temperature heat exchange fluid circuit 209.

In this embodiment, low-temperature heat exchange fluid stream 205 is cooled in three-fluid heat exchanger 251 by low pressure liquid air conditioning refrigerant stream 235 in air conditioning refrigerant heat exchange fluid circuit 239. Low pressure liquid air conditioning refrigerant stream 235 may vaporize in three-fluid heat exchanger 251 and exit as warmed low pressure gas air conditioning refrigerant stream 233 in air conditioning refrigerant heat exchange fluid circuit 239. Compressor 237 increases the pressure on the low pressure gas air conditioning refrigerant stream 233 to yield hot high pressure air conditioning refrigerant stream 234, which then is cooled and condensed in condenser 231. This condensation produces high pressure liquid air conditioning refrigerant stream 232, which is cooled by expansion across expansion valve 236 to form low pressure liquid air conditioning refrigerant stream 235 in three-fluid heat exchanger 251. Low pressure liquid air conditioning refrigerant stream 235 then exchanges heat with the warm low-temperature heat exchange fluid stream to cool it in three-fluid heat exchanger 251.

In this embodiment, high-temperature heat exchange fluid circuit 249 is not used to change the temperature of motive battery 201. Rather, high-temperature heat exchange fluid stream 255 flows through three-way valve 256 to form high-temperature heat exchange fluid stream 254 without being proportioned. Thus, the entirety of warmed portion stream 254 of high-temperature heat exchange fluid stream 155 is the entirety of the high-temperature heat exchange fluid flow. Warmed portion stream 254 is cooled in radiator 257 and flows in the direction of flow arrow 259 in high-temperature heat exchange fluid circuit 249.

Figure 3:
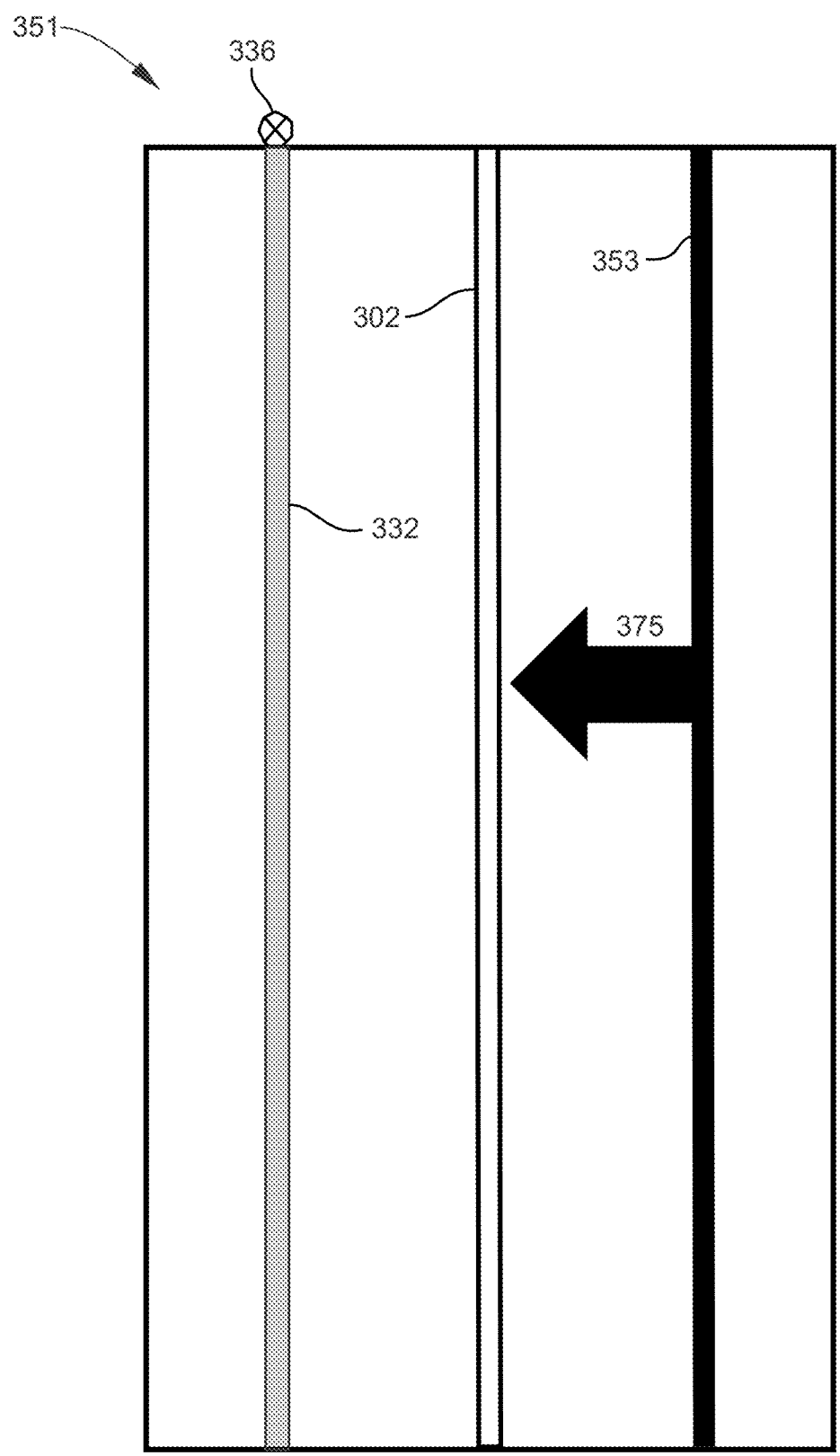
FIG. 3 illustrates heat flow in an embodiment of a three-fluid heat exchanger in a warming operation.

Cool high-temperature heat exchange fluid stream 255 now is used to cool first power electronic device 260, second power electronic device 261, and third power electronic device 262. The now-warmed high-temperature heat exchange fluid stream 271 is pumped in high-temperature heat exchange fluid circuit 249 through pump 265 in the direction of flow arrow 266 to three-way valve 256. As set forth above, first power electronic device 260, second power electronic device 261, and third power electronic device 262 may be selected from power electronic devices present in the system and arranged in an order affording efficient heat exchange. Further, there may be more or fewer power electronic devices in high-temperature heat exchange fluid circuit 249, FIG. 3 provides an expanded view of an embodiment of flow of high-temperature heat exchange fluid circuit 149, low-temperature heat exchange fluid circuit 109, and air conditioning refrigerant heat exchange fluid circuit 139 (see FIG. 1) in three-fluid heat exchanger 351 when the motive battery is being warmed. Heat is transferred from first warmed portion stream 353 of high-temperature heat exchange fluid to stream 302 of low-temperature heat exchange fluid. Because there is no flow of air conditioning refrigerant across expansion valve 336, there is no flow of air conditioning refrigerant at stream 332.

Figure 4:
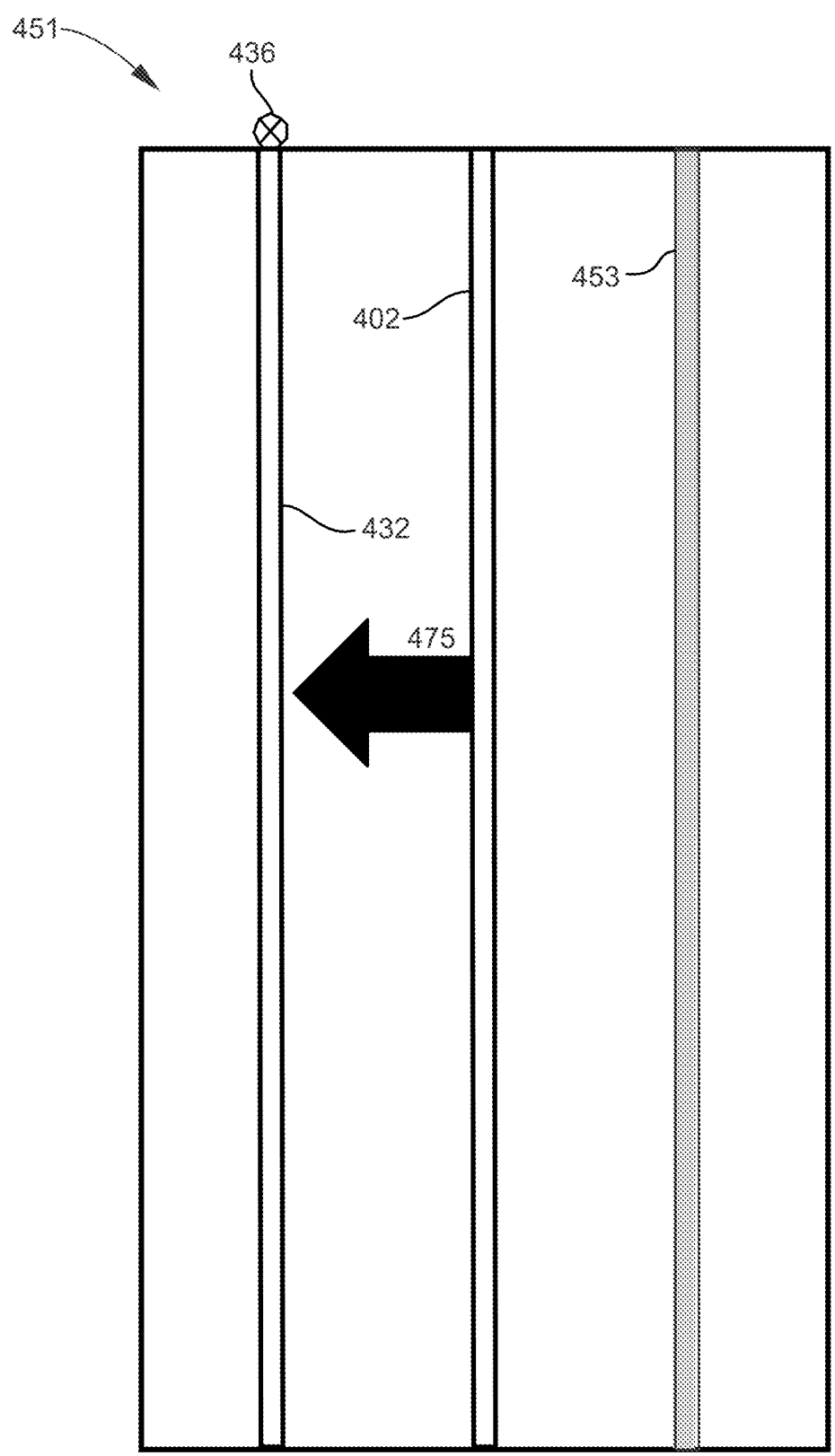
FIG. 4 illustrates heat flow in and embodiment of a three-fluid heat exchanger in a cooling operation.

FIG. 4 provides an expanded view of an embodiment of flow of high-temperature heat exchange fluid circuit 249, low-temperature heat exchange fluid circuit 209, and air conditioning refrigerant heat exchange fluid circuit 239 (see FIG. 2) in three-fluid heat exchanger 451 when the motive battery is being cooled. In such embodiments, there is no flow of high-temperature fluid at 453, as heat from the high-temperature heat exchange fluid circuit 249 is dissipated in radiator 257. Heat flows in the direction of flow arrow 475 to low pressure liquid air conditioning refrigerant stream 432 and low-temperature heat exchange fluid stream 480 is cooled.

Figure 5:
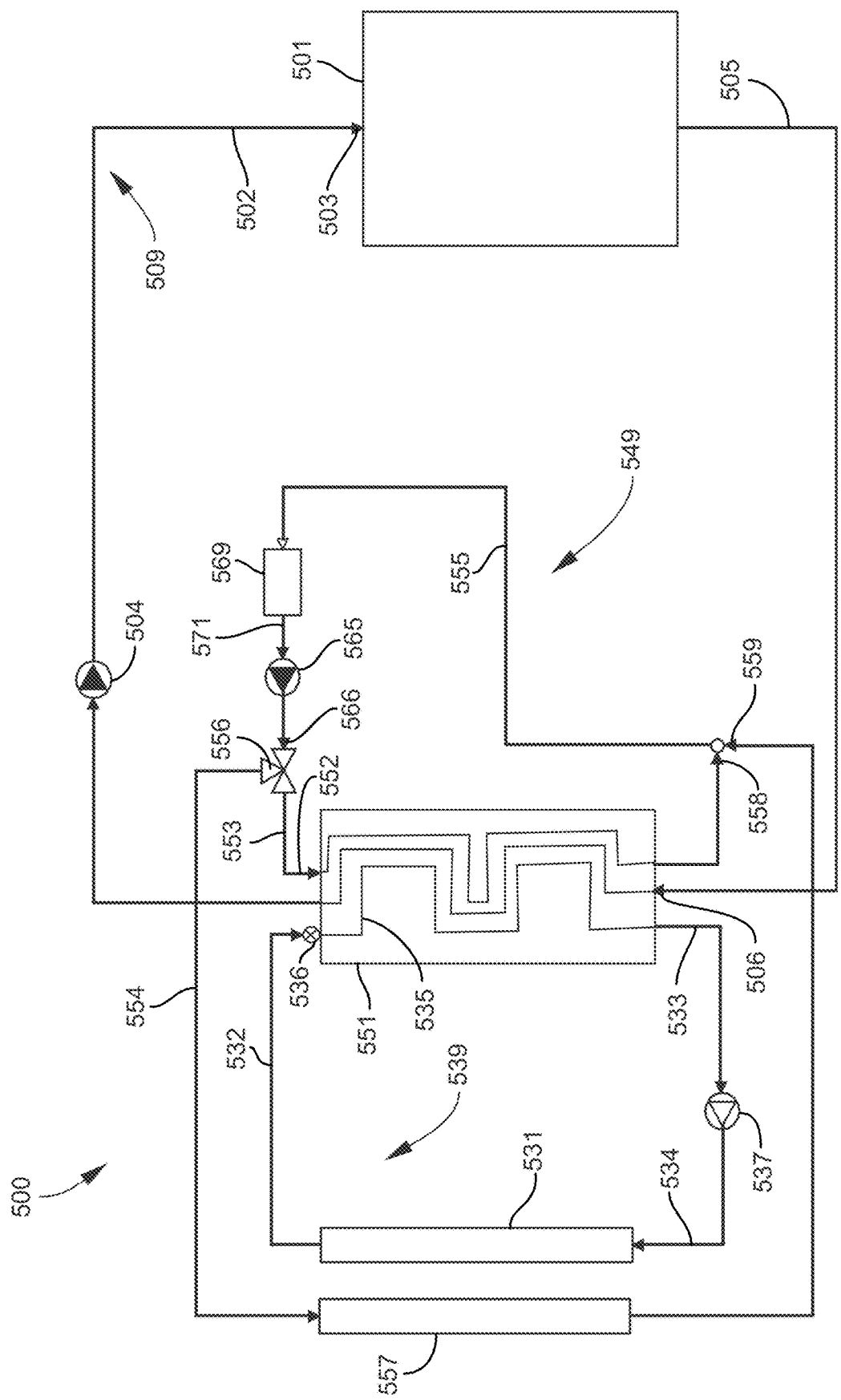
FIG. 5 illustrates another embodiment of a system warming a motive battery.

FIG. 5 illustrates an embodiment of the disclosure in a plug-in hybrid electric vehicle (PHEV). The motive battery is warmed in this PHEV system. In system 500, motive battery 501 is warmed by flow of warmed low-temperature heat exchange fluid stream 502 flowing in the direction of flow arrow 503 in low-temperature heat exchange fluid circuit 509. As it leaves motive battery 501, now-cooled low-temperature heat exchange fluid stream 505 flows in the direction of flow arrow 506 to three-fluid heat exchanger 551. Low-temperature heat exchange fluid stream 506 flows through three-fluid heat exchanger 151 in low-temperature heat exchange fluid circuit 509. Warmed low-temperature heat exchange fluid stream 506 leaves three-fluid heat exchanger 551 as warm low-temperature heat exchange fluid stream 502, and is circulated through motive battery 501 by pump 504.

In this embodiment, low-temperature heat exchange fluid stream 505 is warmed in three-fluid heat exchanger 551 by first warmed portion stream 553 of high-temperature heat exchange fluid stream 571 in high-temperature heat exchange fluid circuit 549. High-temperature heat exchange fluid stream 571 is divided at three-way valve 556 into first warmed portion 553 of high-temperature heat exchange fluid stream 571 and second warmed portion 554 of high-temperature heat exchange fluid stream 571 in high-temperature heat exchange fluid circuit 549. Second warmed portion 554 of high-temperature heat exchange fluid stream 571 is cooled in radiator 557 and re-joined at flow arrow 559 with first warmed portion stream 553 at flow arrow 558 after first warmed portion stream 553 is cooled in three-fluid heat exchanger 551. As described above, the relative flow rates of first warmed portion 553 and second warmed portion 554 are adjusted to provide the heat required to heat motive battery 501, with the remainder of the heat dissipated in radiator 557.

In this embodiment, high-temperature heat exchange fluid cooled in radiator 557 is rejoined at flow arrow 559 with the flow at flow arrow 558 of cooled high-temperature heat exchange fluid from three-fluid heat exchanger 551. These two streams are combined to form high-temperature heat exchange fluid stream 555. In high-temperature heat exchange fluid circuit 549, cool high-temperature heat exchange fluid stream 555 now is used to cool engine 569 and is warmed thereby. Now-warmed high-temperature heat exchange fluid stream 571 is pumped through pump 565 in the direction of flow arrow 566 to three-way valve 556 in high-temperature heat exchange fluid circuit 549.

In this embodiment, heat introduced into the air conditioning refrigerant by compressor 537 is passed through condenser 531 with minimum heat exchange, i.e., by minimizing removal of heat from air conditioning refrigerant stream 534. In this way, air conditioning refrigerant stream 532 carries heat into three-fluid heat exchanger 551 after being further cooled by expansion across expansion valve 536. Thus, air conditioning refrigerant stream 535 transferred heat to low-temperature heat exchange fluid stream 502 in three-fluid heat exchanger 551. There may be a minor heat loss, as illustrated and discussed with regard to FIG. 8 below.

Figure 6:
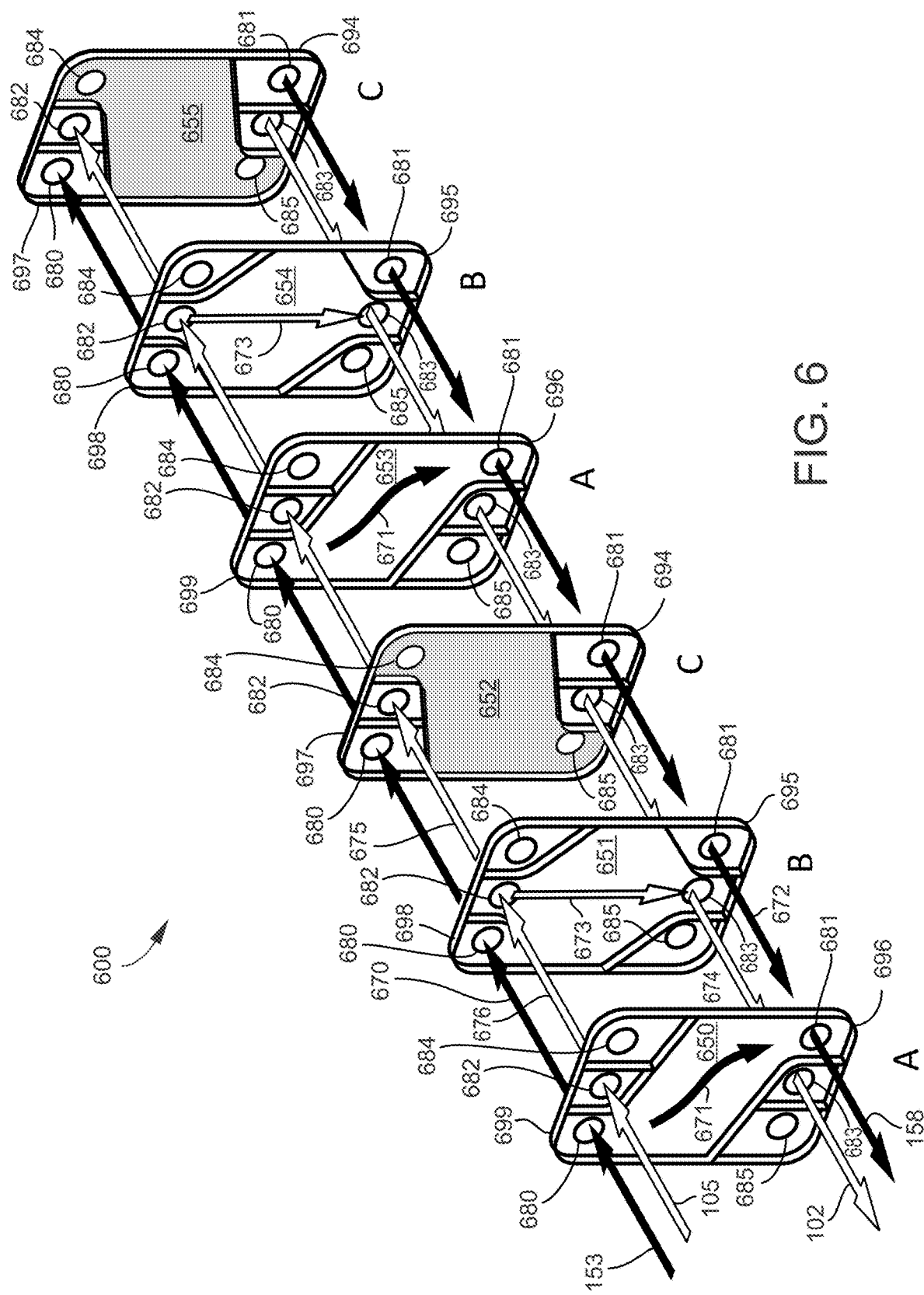
FIG. 6 illustrates flows in a heat exchanger in an embodiment of the disclosure.

As can be seen in FIG. 1, FIG. 2, and FIG. 6, the low-temperature heat exchange fluid circuit is between the high-temperature heat exchange fluid circuit and the air conditioning refrigerant heat exchange fluid circuit in the three-fluid heat exchanger. This arrangement facilitates heat flow between the low-temperature heat exchange fluid and the high-temperature heat exchange fluid and between the low-temperature heat exchange fluid and the air conditioning refrigerant.

FIG. 6 illustrates an embodiment of the flow paths of the high-temperature heat exchange fluid and low-temperature heat exchange fluid in an embodiment of three-fluid stacked plate heat exchanger 600. As can be seen in FIG. 6, this embodiment of three-fluid heat exchanger 600 comprises 3 configurations of plates. Each plate has a row of 3 openings at a first edge of the plate and a second row of 3 openings at a second edge of the plate opposite the first edge. For plate A, row 699 of inlet openings is on a first edge of the plate, and row 696 of outlet openings is at the second edge opposite the first edge. Similarly, for plate B, row 698 of inlet openings is on a first edge of the plate, and row 695 of outlet openings is at the second edge opposite the first edge. Similarly, for plate C, row 697 of inlet openings is on a first edge of the plate, and row 694 of outlet openings is at the second edge opposite the first edge. In embodiments, the edges are on the shorter edges of each plate. However, the edges may be the longer edges of each plate in other embodiments. Still other arrangements and shapes of both plates and openings may be used.

However, without regard to the selection of the arrangement and shapes, the openings are paired to ensure adequate heat transfer and to avoid hot spots in three-fluid heat exchanger 600. The plates enable heat exchange when a first fluid flows across a first face of a plate and a second fluid flows across the opposite side of that face of that plate. For convenience, the first side of a plate is the side shown in the drawing figures, and the opposite side is the side of each plate that cannot be seen in the drawing figures. Plate A, Plate B, and Plate C differ in the identity of the fluid that flows across the plate for heat exchange. In use, the plates are adjacent and touching.

Figure 7:
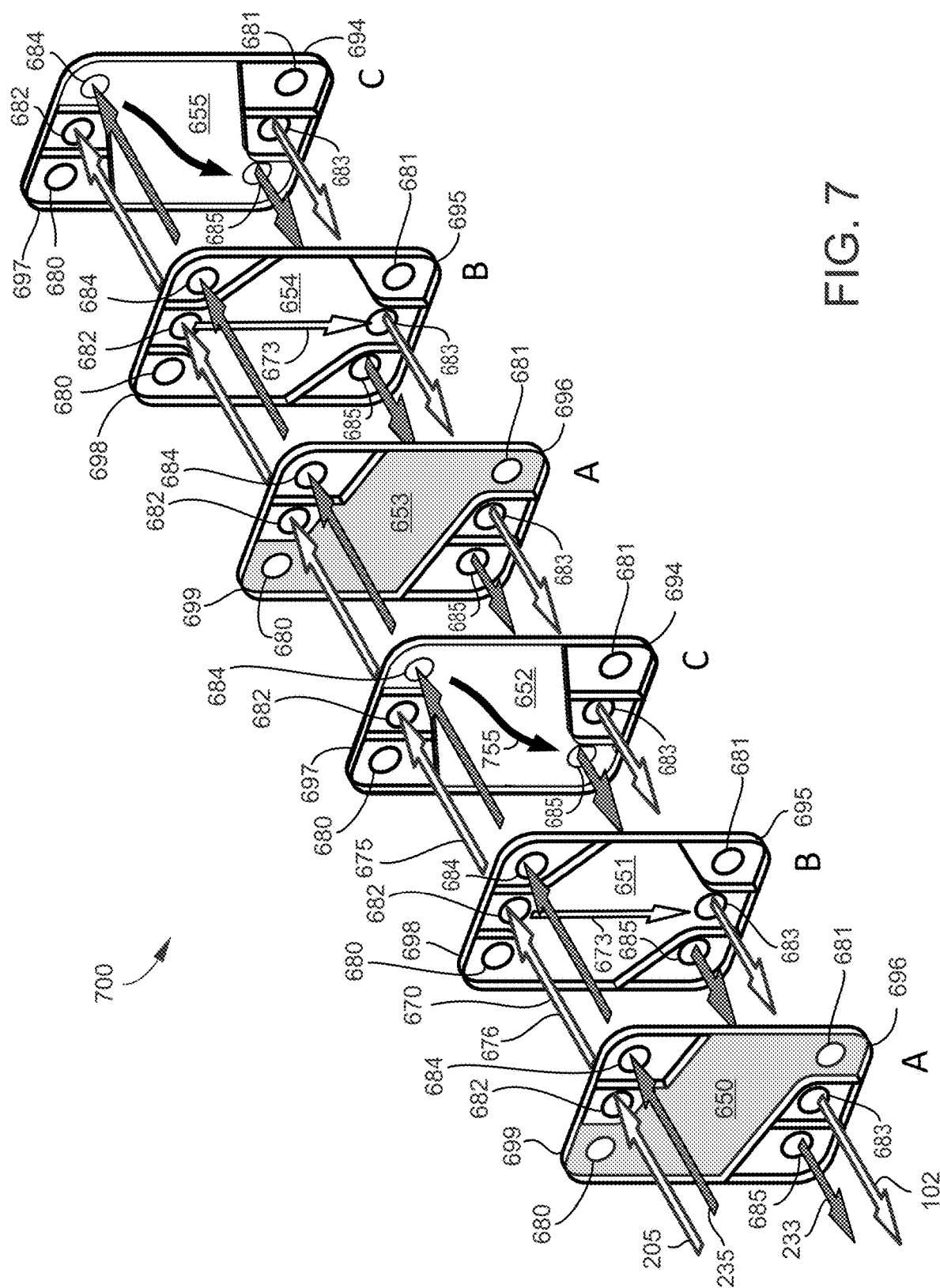
FIG. 7 illustrates flows in a heat exchanger in another embodiment of the disclosure.
Figure 8:
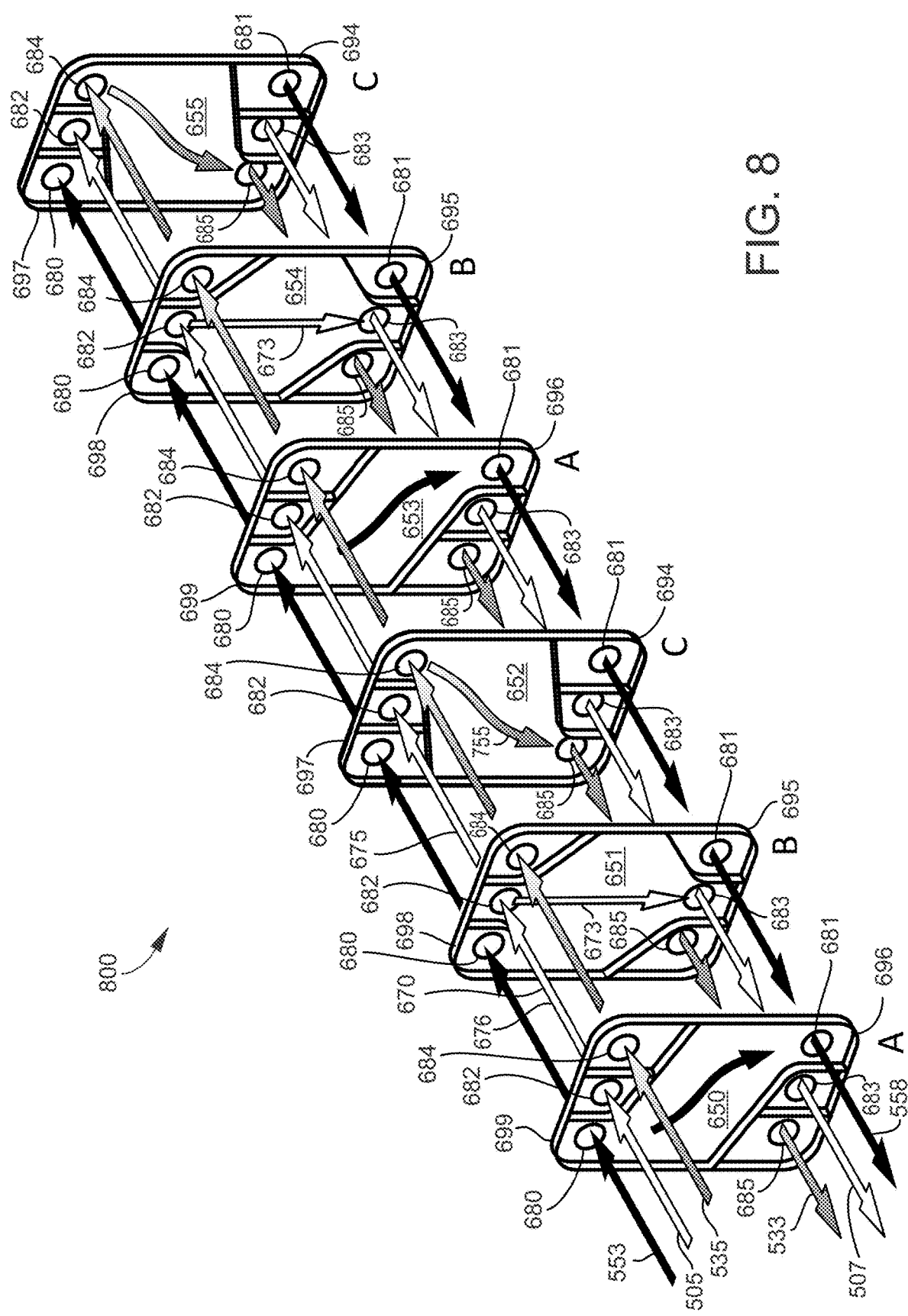
FIG. 8 illustrates flows in a heat exchanger in yet another embodiment of the disclosure.

As can be seen in FIG. 6, FIG. 7, and FIG. 8, the purpose of the openings in the inlet rows of openings is to allow fluid pass through to the next plate as the fluids flow into the three-fluid heat exchanger. Similarly, the openings in the outlet rows of openings allow fluid to pass through to the next plate as the fluids flow out of the three-fluid heat exchanger. Each inlet opening is paired with an outlet opening on the same plate. Each fluid flows only through openings in the same relative position on the plate.

In embodiments illustrated in FIG. 6, FIG. 7, and FIG. 8, first plate 650 is plate type A, second plate 651 is plate type B, and third plate 652 is plate type C. Then, in sequence again, the next plate is fourth plate 653. Fourth plate 653 is an A-type plate and is followed by B-type fifth plate 654, and then C-type sixth plate 655. Three-fluid heat exchanger 600, three-fluid heat exchanger 700, and three-fluid heat exchanger 800 comprise a plurality of plates assembled in the order of plate type A, plate type B, and plate type C, as described herein and shown in the figures.

Each of three-fluid heat exchanger 600, three-fluid heat exchanger 700, and three-fluid heat exchanger 800 have the same mechanical construction, as can be seen in the figures. FIG. 6 illustrates use of three-fluid heat exchanger 600 with a flow pattern of the embodiment of FIG. 1. FIG. 7 illustrates use of three-fluid heat exchanger 700 with a flow pattern of the embodiment of FIG. 2. FIG. 8 illustrates use of three-fluid heat exchanger 800 with a flow pattern of the embodiment of FIG. 5.

Inlet row 699 on plate type A includes first inlet opening 680A, second inlet opening 682A, and third inlet opening 684A. Each inlet opening is paired with an outlet opening in outlet row 696. First inlet opening 680A is paired with first outlet opening 681A, second inlet opening 682A is paired with second outlet opening 683A, and third inlet opening 684A is paired with third outlet opening 685A.

Inlet row 698 on plate type B includes first inlet opening 680B, second inlet opening 682B, and third inlet opening 684B. Each inlet opening is paired with an outlet opening in outlet row 695. First inlet opening 680B is paired with first outlet opening 681B, second inlet opening 682B is paired with second outlet opening 683B, and third inlet opening 684B is paired with third outlet opening 685B.

Inlet row 697 on plate type C includes first inlet opening 680C, second inlet opening 682C, and third inlet opening 684C. Each inlet opening is paired with an outlet opening in outlet row 694. First inlet opening 680C is paired with first outlet opening 681C, second inlet opening 682C is paired with second outlet opening 683C, and third inlet opening 684C is paired with third outlet opening 685C.

As described above, fluid flows only through openings in the same relative position on the plate. In the embodiment illustrated in FIG. 6, high-temperature heat exchange fluid stream 153 is introduced to plate 650 and flows both through opening 680A as high-temperature heat exchange fluid stream 670 and across plate 650 as high-temperature heat exchange fluid stream 671. High-temperature heat exchange fluid stream 671 then joins high-temperature heat exchange fluid stream 672, which flows through first outlet opening 681C from plate 651, and the combined stream leaves three-fluid heat exchanger 650 as high-temperature heat exchange fluid stream 158. High-temperature heat exchange fluid stream 670 continues through first inlet opening 680B of plate 651 and then through first inlet opening 680C. After flowing through first inlet opening 680C, high-temperature heat exchange fluid flows onto next type A plate, which is fourth plate 653, and repeats the pattern.

On plate 650, low-temperature heat exchange fluid stream 105 passes through second inlet opening 682A to second plate 651 as low-temperature heat exchange fluid stream 676 and is divided into 2 streams. Low-temperature heat exchange fluid stream 673 flows across second plate 651 and combines with low-temperature heat exchange fluid flowing through second outlet opening 683B from third plate 652. The combined low-temperature heat exchange fluid stream flows through opening 683A and out of three-fluid heat exchanger 600 as low-temperature heat exchange fluid stream 102. The remainder of the low-temperature heat exchange fluid stream, low-temperature heat exchange fluid stream 675, flows through second inlet opening 682C and then through second inlet opening 682A on fourth plate 683. As the air conditioning refrigerant stream does not flow to three-fluid heat exchanger 600, there is no flow through 684A or 685A for such embodiments.

In embodiments illustrated in FIG. 7, flow of high-temperature heat exchange fluid bypasses three-fluid heat exchanger 700. Low-temperature heat exchange fluid stream 205 takes the same flow path as low-temperature heat exchange fluid stream 105 described in FIG. 6. In the embodiments illustrated in FIG. 7, air conditioning refrigerant stream 235 enters three-fluid heat exchanger 700 and flows through third opening 683A on plate 650 and third opening 683B on plate 651. As the stream flows onto plate 652, it is divided. Part of the stream goes through third inlet opening 684C and the remaining part flows across third plate 652 as air conditioning refrigerant stream 755. Stream 755 combines with air conditioning refrigerant that passes through third outlet opening 685A from fourth plate 653 to form air conditioning refrigerant exit stream 233, which passes through third outlet opening 685B on second plate 651 and 685A on first plate 650 before leaving three-fluid heat exchanger 700.

FIG. 8 illustrates an embodiment of a flow scheme of FIG. 5. In these embodiments, high-temperature heat exchange fluid stream 553 enters first inlet opening 680A on plate 650 and passes through three-fluid heat exchanger 800 as high-temperature heat exchange fluid stream 558 in the same way high-temperature heat exchange fluid stream 153 passes through three-fluid heat exchanger 600. Similarly, low-temperature heat exchange fluid stream 505 enters through second inlet opening 682A and flows through three-fluid heat exchanger 800 in the same way low-temperature heat exchange fluid stream 105 passes through three-fluid heat exchanger 600, leaving three-fluid heat exchanger 700 as low-temperature heat exchange fluid stream 502. Air conditioning refrigerant stream 535 enters at third inlet 684A on first plate 650, passes through third inlet opening 684B, and flows across plate 652, leaving three-fluid heat exchanger 800 as air conditioning refrigerant stream 533.

The embodiment in FIG. 6 illustrates harvesting of heat from the power electronics, i.e., from the high-temperature heat exchange fluid, without air conditioning refrigerant flowing through three-fluid heat exchanger 600. However, other embodiments, in which air conditioning refrigerant is used for heat exchange, are illustrated in FIG. 7 and FIG. 8.

As can be seen for each type of plate, fluid flows across the plate to exchange heat with the fluid on the adjacent plate or flows through without appreciable heat exchange to the next plate of the same type. The flow rates of the fluids through the stacked plate three-fluid heat exchanger are set so that there is significant turbulence as fluid flows across the plate. Together with the large surface for heat exchange afforded by the plates, heat exchange is rapid and efficient. Approach temperatures may be as little as about 5° C., and typically are about 2° C. or about 1° C.

Figure 9:
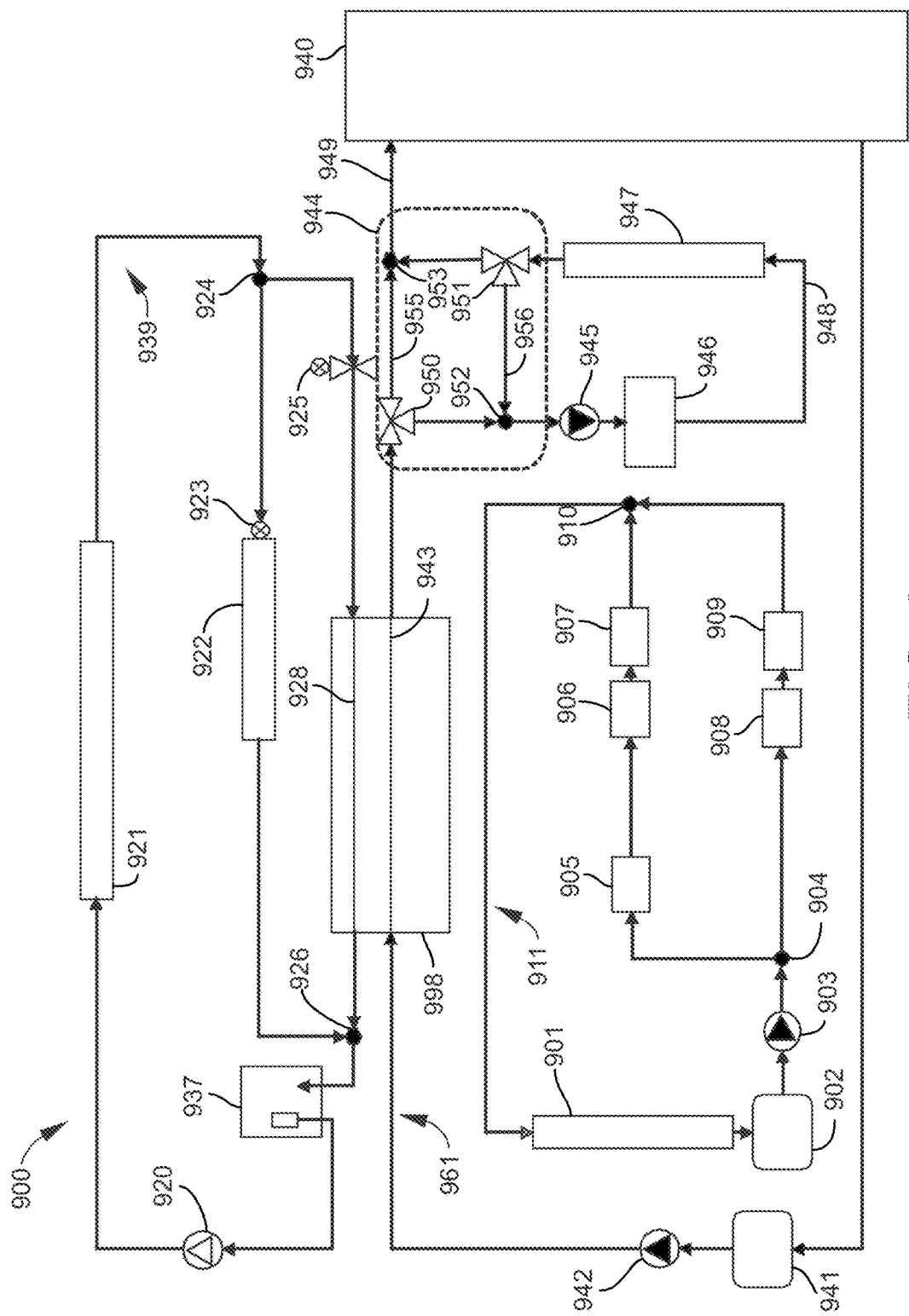
FIG. 9 illustrates a prior art system.

FIG. 6 illustrates embodiments of use of three-fluid heat exchanger 151 to heat low-temperature heat exchange fluid in a system that may be called "heat harvesting", i.e., harvesting of heat from the power electronics high-temperature heat exchange fluid circuit to warm cool low-temperature heat exchange fluid stream 102 for the purpose of warming the motive battery or an integrated power unit (see FIG. 9). FIG. 7 illustrates "AC Chilling." In this embodiment, air conditioning refrigerant low-pressure liquid 235 cools low-temperature heat exchange fluid 205. Thus, air conditioning is used to cool motive battery 201 or, in other embodiments, an integrated power unit.

FIG. 8 illustrates an embodiment of operation of three-fluid heat exchanger 551 in a configuration for a plug-in hybrid electric vehicle (PHEV). This arrangement also may be used in other embodiments and configurations, as discussed below. Three-fluid heat exchanger 551 uses all three fluids, i.e., high-temperature heat exchange fluid, low-temperature heat exchange fluid, and air conditioning refrigerant simultaneously. The embodiment of FIG. 8 includes the high-temperature heat exchange fluid flow as in an embodiment of FIG. 6 and the air conditioning refrigerant flow as in an embodiment of FIG. 7. Thus, as can be seen in FIG. 8, in this embodiment, warm high-temperature heat exchange fluid stream 553 flows across plates A and leaves as cool high-temperature heat exchange fluid stream 558; cooled low-temperature heat exchange fluid 505 flows across plates B and leaves as warmed low-temperature heat exchange fluid stream 502; and cool low-pressure liquid air conditioning refrigerant stream 535 flows across plates C and leaves as low pressure gas air conditioning refrigerant 533.

In this embodiment, because fluid is flowing across each plate, there may incidental heat exchange in the direction opposite the intended path. Any transfer of heat to the high-temperature heat exchange fluid from the air conditioning refrigerant is considered a loss because the object is to return low-temperature high-temperature heat exchange fluid at the lowest possible temperature for cooling of engine 569 (see FIG. 5) and other features of the power electronics. Thus, there may be some flow of heat in a direction contrary to the direction that provides the heat transfer benefit sought herein. However, these losses typically are small and are not expected to present difficulty in achieving the expected result herein.

Figure 10:
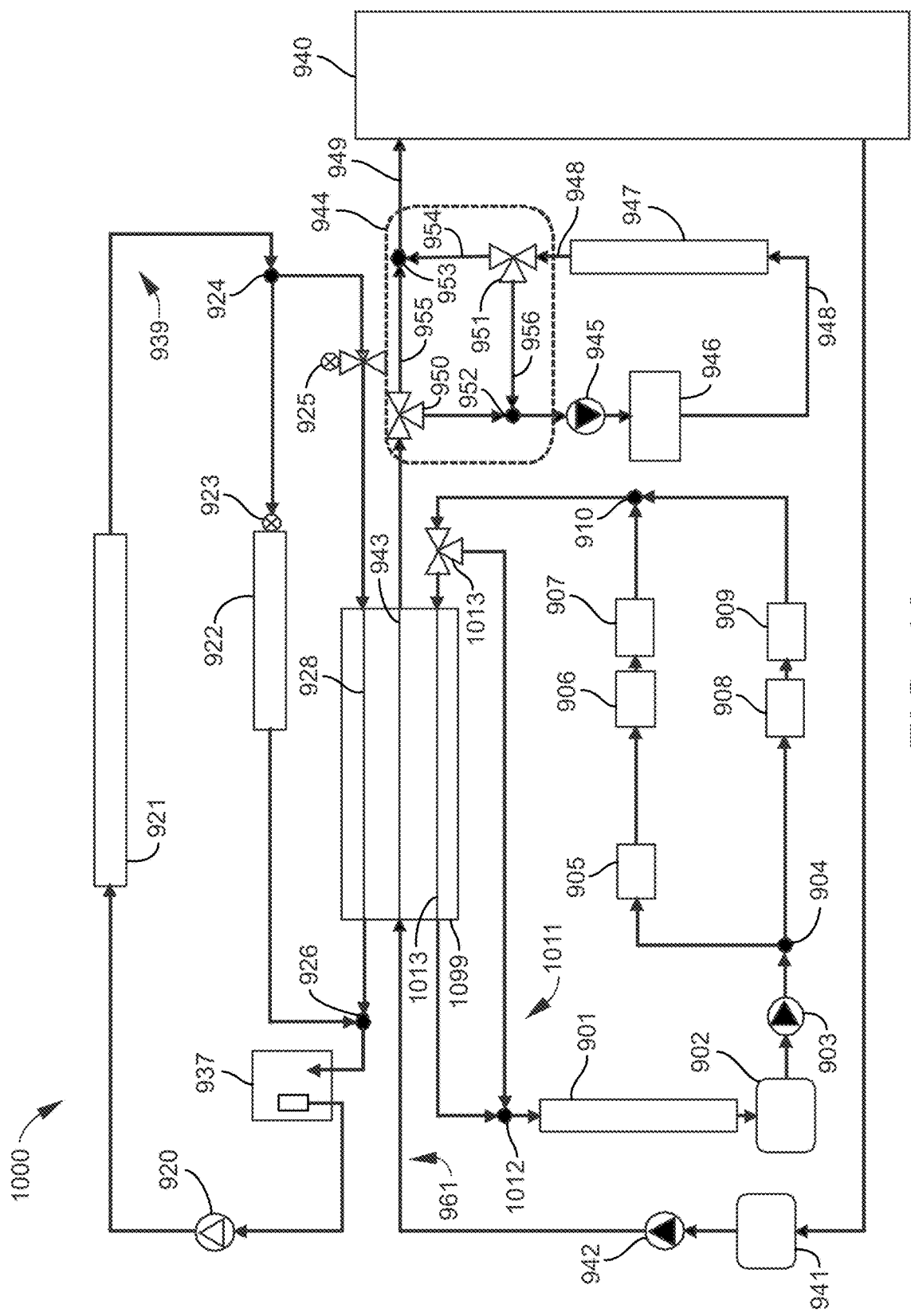
FIG. 10 illustrates an embodiment of the disclosure.

FIG. 9 depicts prior art and FIG. 10, FIG. 11, FIG. 12, and FIG. 13 depict various embodiments of the disclosure. FIG. 9 illustrates a prior art system that includes a chiller and combined cabin/integrated power unit heating that does not include a high-temperature heat exchange fluid stream. FIG. 10 illustrates an embodiment that incorporates a three-fluid heat exchanger in an embodiment that harvests heat from the power electronics circuit, i.e., the circuit in which the high-temperature heat exchange fluid cools the power electronics. This heat is used to heat the motive battery and the passenger cabin. In contrast, this heat is dissipated to the atmosphere in the prior art system. This embodiment also includes combined cabin/integrated power unit heating and a four-way valve manifold.

Figure 11:
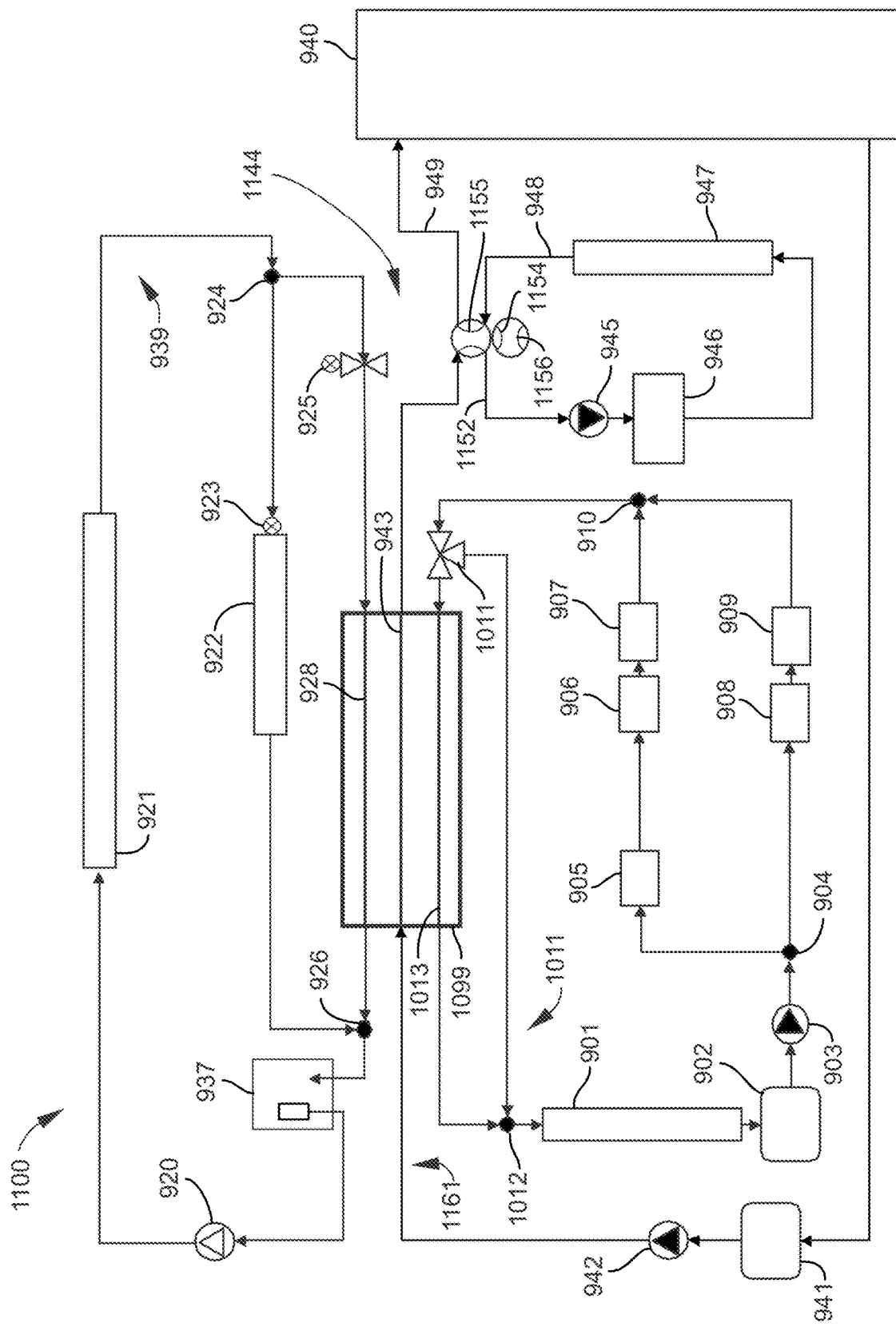
FIG. 11 illustrates another embodiment of the disclosure.
Figure 12:
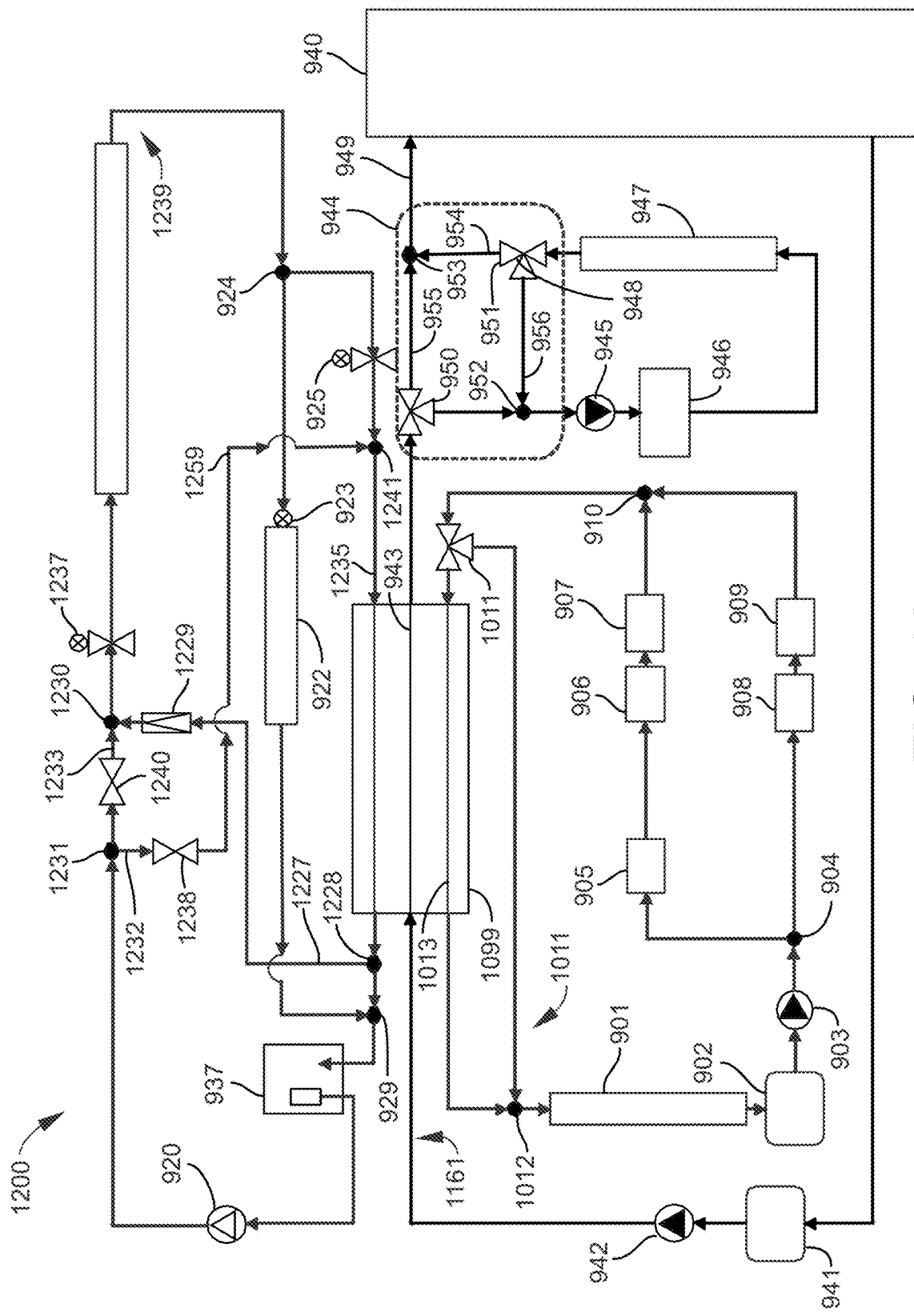
FIG. 12 illustrates yet another embodiment of the disclosure, further comprising a heat pump.

FIG. 11 illustrates a system having the features of the system of FIG. 10 with a four-way valve in place of the four-way valve manifold. FIG. 12 includes the features of the system of FIG. 10 and further includes a heat pump in the air conditioning refrigerant circuit, whereas FIG. 13 includes the features of the system of FIG. 12 with a four-way valve substituted for the four-way valve manifold. As will be seen below, the four-way valve requires fewer mechanical parts.

As can be seen in FIG. 9, prior art system 900 includes a high-temperature heat exchange fluid circuit 911, a low-temperature heat exchange fluid Circuit 961 that includes both cabin heating 947 and integrated power unit 940 heating, and an air conditioning/chiller circuit 931. The air conditioning/chiller circuit exchanges heat with the low-temperature heat exchange fluid in prior art two-fluid heat exchanger 998.

As can be seen, warm high-temperature heat exchange fluid is cooled in radiator 901, which dissipates the heat to the atmosphere. Expansion tank 902 accommodates expansion of the high-temperature heat exchange fluid in high-temperature heat exchange fluid circuit 911 as the temperature becomes warmer with use. Pump 903 moves cooled high-temperature heat exchange fluid to divider 904 to cause some of the cool high-temperature heat exchange fluid to flow to and cool first component 905, second component 906, and third component 907. The remainder of the cool high-temperature heat exchange fluid cools fourth component 908 and fifth component 909. These components may be any components requiring cooling, such as power control units, motors, chargers, or any of the components associated with a high-temperature heat exchange fluid stream above. The fluid streams then are rejoined at point 910 and hot high-temperature heat exchange fluid is introduced to radiator 901.

High pressure gas air conditioning refrigerant is circulated in air conditioning refrigerant heat exchange fluid circuit 931 through condenser 921 and recovered as high pressure liquid air conditioning refrigerant. The high pressure liquid air conditioning refrigerant stream is split at splitter 924. A first stream passes through expansion valve 923 and enters two-fluid heat exchanger 998 as stream 928. A second stream passes through expansion valve 923 and enters evaporator 922. The first stream from the two-fluid heat exchanger 928 and the second stream from evaporator 922 are is mixed at recombination point 926. The combined stream flows through accumulator 937 to form a stream of low pressure gas air conditioning refrigerant. This stream then is compressed to form a high pressure air conditioning refrigerant stream that is sent to condenser 921.

Cooled low-temperature heat exchange fluid 943 in low-temperature heat exchange fluid circuit 961 flows from two-fluid heat exchanger 998 to valve assembly 944. Valve assembly 944 is an assembly of two 3-way valves and associated piping arranged to allow flow in four directions. Cooled low-temperature heat exchange fluid may flow through three-way valve 950 as stream 955 to blend point 953, or may flow to blend point 952. The blended stream is pumped through pump 945 to component 946, which may be an electric cabin heater. The fluid then flows to heater core 947 to warm the passenger cabin, where it is cooled and flows to three-way valve 951. The fluid may be circulated in a loop in low-temperature heat exchange fluid circuit 961 by returning it as stream 956 to blend point 952. Any portion may be recycled, with the remainder flowing to blend point 953.

As can be seen in FIG. 9, from blend point 953, the blended fluid 949 is introduced to IPU 940 to heat it. The fluid then flows in low-temperature heat exchange fluid circuit 961 to expansion tank 941 and pump 942 after warming IPU 940.

FIG. 10 illustrates an embodiment of the disclosure combining heat harvesting with combined cabin and integrated power unit heating. Heat harvesting is removing heat from the high-temperature heat exchange fluid in high-temperature heat exchange fluid circuit 1011 for use elsewhere in the electric vehicle, rather than for dissipation to the atmosphere. System 1000 differs from the prior art system 900 by heat harvesting from the high-temperature heat exchange fluid circuit 1011 in three-fluid heat exchanger 1099.

To harvest heat from the high-temperature heat exchange fluid, three-way valve 1011 is placed in the line that returns high-temperature heat exchange fluid from blend point 910 to radiator 901 in high-temperature heat exchange fluid circuit 1011. Heat is harvested from one stream 1013 of high-temperature heat exchange fluid after blend point 910. Stream 1013 is passed through three-fluid heat exchanger 1099 to transfer heat from the high-temperature heat exchange fluid to low-temperature heat exchange fluid stream 943 in three-fluid heat exchanger 1099. The remainder of high-temperature heat exchange fluid not passed through three-fluid heat exchanger 1099 is taken from valve 1011 and bypasses three-fluid heat exchanger 1099. This stream then is rejoined with cooled stream 1013 at blend point 1012, and the blended stream is cooled in radiator 901. In this embodiment, heat is harvested from the high-temperature heat exchange fluid to heat the cabin and integrated power unit 940.

In some embodiments, a single four-way valve is substituted for the four-way valve manifold. System 1100 in FIG. 11 is one such embodiment. Four-way valve 1144 is substituted for valve assembly 944 in low-temperature heat exchange fluid circuit 1161. Four-way valve 1144 may be aligned so that all of warmed low-temperature heat exchange fluid stream 943 is pumped to electric cabin heater 946 and then cooled in heater core 947. From heater core 947, the fluid exits as fluid 948 and passes through four-way valve 1144 as flow 1155, and thence as low-temperature heat exchange fluid stream 949 to heat integrated power unit 940.

In the alternative, 4-way valve 1144 can be aligned to have all of warmed low-temperature heat exchange fluid stream 943 fed directly to motive battery or integrated power unit 940 as stream 949 through valve first flow path 1154. With the 4-way valve aligned in this way, fluid may be circulated solely through valve second flow path 1156 by pump 945. Thus, the fluid flows through pump 945, electric cabin heater 946, cabin heater core 947, and valve second flow path 1156.

FIG. 12 illustrates system 1200, an embodiment of system 1000 further comprising a heat pump. In some embodiments of system 1200, diversion valve 1240 is installed between compressor 920 and condenser 921 in air conditioning refrigerant heat exchange fluid circuit 1239. Flow of high pressure gas air conditioning refrigerant flowing from compressor 920 to condenser 921 may be diverted and combined with low pressure liquid air conditioning refrigerant at blend point 1241 to flow into three-fluid heat exchanger 1099.

In some embodiments, diversion valve 1240 and heat pump inlet flow valve 1238 are operated in cooperation air conditioning refrigerant heat exchange fluid circuit 1239. In particular, only one of these valves may be closed at a time during normal operation. Closing both of these valves simultaneously would preclude circulation of air conditioning refrigerant. Rather, the valves are operated in cooperation to proportion the flow of high pressure gas air conditioning refrigerant at split point 1231. Diversion valve 1240 and inlet valve 1238 are adjusted to that the quantity of high pressure gas air conditioning refrigerant flows to the three-fluid heat exchanger as stream 1232. After passing through inlet valve 1238, the high pressure gas air conditioning refrigerant is identified as stream 1259.

High pressure gas air conditioning refrigerant stream 1259 is combined with low pressure liquid air conditioning refrigerant at blend point 1241 to form stream 1235, which flows into three-fluid heat exchanger 1099. After passing through three-fluid heat exchanger 1099, stream 1235 is low pressure liquid air conditioning refrigerant. Stream 1235 is split at divider 1228, with a portion continuing through to accumulator 937 and then compressor 920.

The remainder of stream 1235 is returned as low pressure liquid air conditioning refrigerant as stream 1227. Stream 1227 passes through check valve 1229 and is blended with stream 1233 after diversion valve 1240 and introduced to condenser 921 through expansion valve 1237. As described above with regard to FIG. 8, high pressure gas air conditioning refrigerant is warm, so minimizing heat transfer in condenser 921 introduces additional heat into three-fluid heat exchanger 1099 for exchange to low-temperature heat exchange fluid 943.

Figure 13:
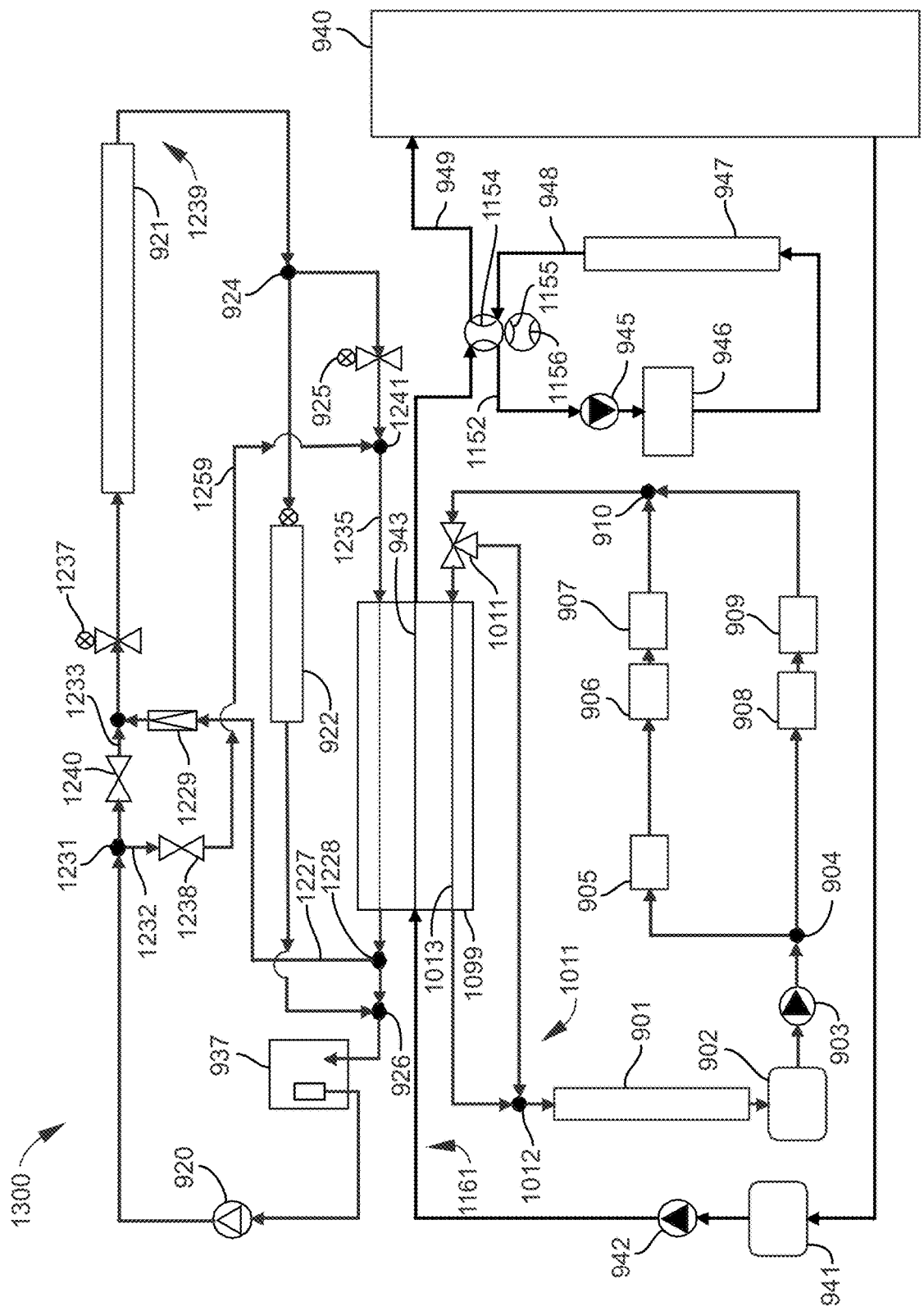
FIG. 13 illustrates still another embodiment of the disclosure, further comprising a heat pump.

System 1300 in FIG. 13 substitutes a four-way valve for the four-way valve manifold utilized in System 1200 (and other embodiments). Operation of the four-way valve in place of the four-way valve manifold is described above as it relates to FIG. 10 and FIG. 11.

Comparison of the complexity of prior art system 900 in FIG. 9 and the various embodiments of system 1000, system 1100, system 1200, and system 1300 indicates that systems including a three-fluid heat exchanger that are embodiments of the disclosure have approximately the same number of parts as prior art system 900. Systems 1200 and 1300 include a heat pump, and so are mechanically more complex.

The number of parts in each portion of each system are set forth in the following Table 1:

| System | 900 | 1000 | 1100 | 1200 | 1300 |
|---|---|---|---|---|---|
| High-temperature heat exchange fluid section | 29 | 35 | 35 | 35 | 35 |
| Low-temperature heat exchange fluid section | 22 | 22 | 16 | 22 | 16 |
| Air conditioning refrigerant section | 18 | 18 | 18 | 35 | 35 |
| Total number of parts | 69 | 75 | 69 | 92 | 86 |

Thus, as can be seen, an embodiment of system 1100, which includes heat harvesting, cabin heating, and integrated power unit heating, has only as many parts at prior art system 900, which does not have heat harvesting.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A heat exchange system for three heat exchange fluids in an electric vehicle, the system comprising:
   a high-temperature heat exchange fluid circuit including high-temperature heat exchange fluid configured to cool one or more internal vehicle devices that require cooling during operation;
   an air conditioning refrigerant circuit including air conditioning refrigerant fluid;
   a low-temperature heat exchange fluid circuit including low-temperature heat exchange fluid configured to heat or cool a motive unit; and
   a three-fluid heat exchanger;
   the three-fluid heat exchanger being included in the high-temperature heat exchange fluid circuit, the air conditioning refrigerant circuit, and the low-temperature heat exchange fluid circuit;
   wherein the system is configured such that the low-temperature heat exchange fluid can be heated in the three-fluid heat exchanger by a warmed portion of the high-temperature heat exchange fluid; and
   wherein the system is configured such that the low-temperature heat exchange fluid can be cooled by the air conditioning refrigerant fluid in the three-fluid heat exchanger.

2. The heat exchange system of claim 1, wherein the three-fluid heat exchanger is a stacked plate heat exchanger.

3. The heat exchange system of claim 2, wherein the stacked plate heat exchanger includes three different plate designs.

4. The heat exchange system of claim 1, further comprising a radiator and a three-way valve in the high-temperature heat exchange fluid circuit, and wherein the system is configured such that the three-way valve controls a relative flow rate of the high-temperature heat exchange fluid into the radiator and a relative flow rate of the high-temperature heat exchange fluid into the three-fluid heat exchanger.

5. The heat exchange system of claim 4, wherein the system is configured such that the three-way valve directs substantially all of the high-temperature heat exchange fluid to the radiator, and substantially none of the high-temperature heat exchange fluid to the three-fluid heat exchanger, when the low-temperature heat exchange fluid is being cooled by the air conditioning refrigerant fluid in the three-fluid heat exchanger.

6. The heat exchange system of claim 4, wherein a temperature of the low-temperature heat exchange fluid is controlled by the relative flow rate of the high-temperature heat exchange fluid into the three-fluid heat exchanger.

7. The heat exchange system of claim 1, wherein the high-temperature heat exchange fluid circuit includes power electronic devices.

8. The heat exchange system of claim 1, wherein the high-temperature heat exchange fluid circuit includes a motor.

9. The heat exchange system of claim 1, wherein the high-temperature heat exchange fluid circuit includes an engine.

10. The heat exchange system of claim 1, wherein the high-temperature heat exchange fluid circuit includes a power control unit.

11. The heat exchange system of claim 1, wherein the high-temperature heat exchange fluid circuit includes a charger.

12. The heat exchange system of claim 1, wherein the motive unit is a motive battery.

13. The heat exchange system of claim 1, wherein the motive unit is an integrated power unit.

14. The heat exchange system of claim 1, wherein the low-temperature heat exchange fluid circuit includes a heater core for providing cabin heat.

15. The heat exchange system of claim 14, further comprising a four-way valve manifold for diverting low-temperature heat exchange fluid to the heater core.

16. The heat exchange system of claim 14, further comprising a 4-way valve for diverting low-temperature heat exchange fluid to the heater core.

17. The heat exchange system of claim 14, wherein the air conditioning refrigerant heat exchange fluid circuit further includes a heat pump.

18. A heat exchange system for three heat exchange fluids in an electric vehicle, the system comprising:
   a high-temperature heat exchange fluid circuit including high-temperature heat exchange fluid for cooling devices that require cooling during operation;
   an air conditioning refrigerant circuit including air conditioning refrigerant fluid;
   a low-temperature heat exchange fluid circuit including low-temperature heat exchange fluid used to heat or cool a motive unit; and
   a three-fluid heat exchanger;

wherein the low-temperature heat exchange fluid circuit further includes a heater core for providing cabin heat and a 4-way valve for diverting low-temperature heat exchange fluid to the heater core.

19. A heat exchange system for three heat exchange fluids in an electric vehicle, the system comprising:
- a high-temperature heat exchange fluid circuit including high-temperature heat exchange fluid for cooling devices that require cooling during operation;
- an air conditioning refrigerant circuit including air conditioning refrigerant fluid;
- a low-temperature heat exchange fluid circuit including low-temperature heat exchange fluid used to heat or cool a motive unit;
- a three-fluid heat exchanger;
- wherein the low-temperature heat exchange fluid circuit further includes a heater core for providing cabin heat; and
- wherein the air conditioning refrigerant heat exchange fluid circuit further includes a heat pump.

* * * * *